UNITED STATES PATENT OFFICE.

ANDREW PETERS, OF BROOKLYN, NEW YORK.

BAKING-POWDER.

SPECIFICATION forming part of Letters Patent No. 331,541, dated December 1, 1885.

Application filed September 5, 1885. Serial No. 176,254. (No specimens.)

*To all whom it may concern:*

Be it known that I, ANDREW PETERS, a citizen of the United States, residing at Brooklyn, in the county of Kings and State of New York, have invented certain new and useful Improvements in Baking-Powders, of which the following is a specification.

The baking-powders in use at the present time consist of mixtures of bicarbonate of soda and sometimes starch or flour and sometimes an ammonia salt with either cream of tartar or tartaric acid or alum. Of these the tartaric-acid and cream-of-tartar powders are expensive, and the alum powder, though cheap, is considered by many injurious to the health of the consumer.

The object of my invention is to produce a powder which, while it preserves substantially all the good qualities of the cream-of-tartar baking-powder, can be prepared at a very much less cost.

The following are the constituents of the baking-powder as I prefer it, though, as hereinafter referred to, I do not confine myself to the exact compound which I am about to describe. Each of the constituents about to be named is the commercial article of that name, and is used in a powdered dry state, (the drier the better,) and they are mixed intimately together in the ordinary manner in which baking-powders have heretofore been prepared.

The constituents which I prefer are as follows: two hundred and forty parts of bisulphate of soda, ($NaHSO_4$,) eighty-four parts of carbonate of magnesia, ($MgCO_3$.)

While in the state of powder the above ingredients remain unchanged; but when used in baking the liquid which is used in the operation causes the bisulphate to unite with the magnesia (an alkaline earth) of the carbonate of magnesia, thereby liberating the carbonic-acid gas, which raises the dough.

In making a useful baking-powder it is essential that the union between the ingredients should not take place until the powder is used, because, if it is likely to take place before, when the powder is kept for a considerable length of time before being used the gas-producing properties of the powder may be in a great measure or entirely destroyed by the spontaneous action of the constituents on one another. When the bisulphate of soda and carbonate of magnesia are in the dry state of the powder, they may remain together for any length of time without serious deterioration. When these ingredients, however, are brought into contact with a liquid, as in the operation of mixing dough, their action is rapid and efficient.

The magnesia being an inert substance, any excess of it produces no injurious effect, as is the case with soda, an excess of which has a tendency to give the article baked a yellowish color.

The following are some of the variations which the constituents of my baking-powder are susceptible of without departing from my invention. In lieu of the soda salts mentioned, potash salts may be substituted for any one or more of the ingredients. Carbonates, bicarbonates, or sesquicarbonates of the bases mentioned may be used indiscriminately, the object being to have some carbonate of the base for the purpose of generating carbonic-acid gas. In lieu of magnesia, lime may be used, though I prefer magnesia; or the carbonate of the alkaline earth might be replaced by a mixture of a carbonate of the alkaline earth with the carbonate of an alkali, though in such case the amount of carbonate of alkaline earth used should preferably be equivalent to at least one-half the acid employed.

In case of variation from the ingredients first named, it will be understood that the quantities of the ingredients will be preferably adjusted to correspond with the chemical equivalents of the substances employed.

My improved baking-powder is put up in cans, cases, packages, or bottles in a thoroughly dry state, and is employed by adding it to the flour prior to the admixture of the water for the preparation of the dough in such proportions as to give off the requisite amount of carbonic-acid gas to raise the dough. The proportions used in mixing are substantially the same as those employed in baking with cream-of-tartar baking-powders, and the following is given as an example, although the proportions may of course be greatly varied with perfectly good results: one quart of flour, one tea-spoonful of salt, half a tea-spoonful of sugar, two tea-spoonfuls of baking-powder, and one and a half pint of milk.

It will be understood that of the four carbonates of the alkaline earths three are available for the purposes of my invention—viz., of magnesia, of lime, and of strontia—the remaining one—baryta—being considered poisonous.

I claim—

1. A baking-powder consisting in its essential elements of a carbonate of lime or magnesia or strontia with an acid sulphate of soda or any other equivalent acid sulphate of an alkali, substantially in the manner and proportions specified.

2. A baking-powder consisting in its essential elements of a carbonate of lime or magnesia or other suitable carbonate of an alkaline earth equivalent for the purpose of the compound with an acid sulphate of soda or any other equivalent acid sulphate of an alkali, substantially in the manner and proportions specified.

ANDREW PETERS.

Witnesses:
LIVINGSTON GIFFORD,
DANIEL H. DRISCOLL.